United States Patent [19]

Saitoh et al.

[11] Patent Number: 4,675,756
[45] Date of Patent: Jun. 23, 1987

[54] MAGNETIC RECORDING AND REPRODUCING APPARATUS

[75] Inventors: Masahiko Saitoh, Hitachi; Gen Seki; Seiichi Hayashi, both of Mito; Yasunori Orihara, Hitachi, all of Japan

[73] Assignee: Hitachi, Ltd., Tokyo, Japan

[21] Appl. No.: 826,001

[22] Filed: Feb. 4, 1986

[30] Foreign Application Priority Data

Feb. 7, 1985 [JP] Japan .................................. 60-20860
Mar. 13, 1985 [JP] Japan .................................. 60-49891
Apr. 30, 1985 [JP] Japan .................................. 60-92835

[51] Int. Cl.$^4$ .......................................... G11B 19/14
[52] U.S. Cl. .................................................... 360/71
[58] Field of Search .................................... 360/69, 71

[56] References Cited

U.S. PATENT DOCUMENTS

4,246,618 1/1981 Bauer ..................................... 360/99
4,450,492 5/1984 Okada et al. ......................... 360/105

Primary Examiner—George G. Stellar
Attorney, Agent, or Firm—Antonelli, Terry & Wands

[57] ABSTRACT

A magnetic recording and reproducing apparatus includes a support assembly and a plurality of magnetic heads supported by the support assembly for recording audio information signals on and reproducing previously recorded audio information signals from a magnetic disc. The magnetic heads are positioned relative to the magnetic disc by a magnetic head moving arrangement which is coupled to engage the disc so as to automatically eject the disc from the magnetic heads.

11 Claims, 12 Drawing Figures

MAGNETIC RECORDING AND REPRODUCING APPARATUS

BACKGROUND OF THE INVENTION

1. Field of the Invention

The present invention relates to a magnetic recording and reproducing apparatus, and more particularly to a magnetic recording and reproducing apparatus provided with an improved automatic magnetic disc ejecting means.

2. Description of the Prior Art

A conventional magnetic recording and reproducing apparatus using a magnetic disc (flexible disc) employs a mechanism for ejecting the magnetic disc manually as described, for example, in the specification of Japanese Patent Laid-open Publication No. 77028/1980.

In such a conventional magnetic recording and reproducing apparatus, attention is paid to the protection of the magnetic disc surface however, the conventional apparatus has the problems of abrasion of the magnetic disc surface, the occurrence of scratches on the magnetic disc surface and damage to the hub portion of the magnetic disc and adsorption of the mgnetic disc surface to a magnetic head surface.

Therefore, there has been a strong demand for a mechanism for preventing contact between the magnetic disc surface and the magnetic head surface while the magnetic recording and reproducing apparatus is not in use, and, especially, a mechanism for automatically ejecting the magnetic disc.

In order for the size of the magnetic recording and reproducing apparatus to reduced, it is necessary that no special-purpose motor for automatically ejecting the magnetic disc be provided.

SUMMARY OF THE INVENTION

An object of the present invention is to provide a magnetic recording and reproducing apparatus wherein the magnetic disc can be ejected without a driving apparatus or power source such as a special-purpose motor for ejecting the magnetic disc automatically.

The present invention provides a magnetic recording and reproducing apparatus having a magnetic disc, means for feeding and ejecting the magnetic disc, magnetic heads for use in recording sounds on the magnetic disc and reproducing the recorded sounds, and magnetic head moving means for determining positions of the magnetic heads with respect to the magnetic disc. The feeding and ejecting means for the magnetic disc is moved by the magnetic head moving means, whereby the magnetic disc is automatically ejected, to attain the above-mentioned object.

According to the present invention, a magnetic recording and reproducing apparatus provided with a mechanism for ejecting the magnetic disc can be reduced in size or miniaturized. Also, the magnetic head moving means is used as the driving power source for the feeding and ejecting means. Therefore, it is not necessary to additionally provide a driving power source such as a special-purpose motor.

DETAILED DESCRIPTION

The mechanical construction of the magnetic recording and reproducing apparatus of one embodiment of the present invention will now be described with reference to FIGS. 1–5. Referring to these drawings, a mounting plate 2, for use in attaching the magnetic recording and reproducing apparatus to a separate piece of hardware, and a front panel 3 are secured to a chassis 1.

The front panel 3 is provided with an opening 3a through which a cartridge 5 containing a magnetic disc 4 therein is inserted into and withdrawn from the magnetic recording and reproducing apparatus.

A holder 6 is supported on support members 7. The support members 7 are provided at the end portions of the chassis 1 in such a manner that the holder 6 can be vertically moved. The support members 7 have guide recesses 7a. The holder 6 is provided at its side ends with rollers 8 which engage the guide recesses 7a.

An ejection lever 9, which constitutes a feeding and ejecting means for the cartridge 5 of the magnetic disc 4, is provided so that it can be moved on the chassis 1. Each of coiled springs 10 is fixed at one end thereof to a mounting member 1a of the chassis 1, and further fixed at the other end to a mounting member 9a of the ejection lever 9.

A resilient retainer 11 is provided with an L-shaped lever 11a, a coiled spring 11b and a pin 11c for attaching the coiled spring 11b and the lever 11a to the chassis 1.

When the ejection lever 9 is moved back to engage a bent locking portion 11d of the lever 11a with a locking bore 9b therein, this engaged condition is maintained by the coiled spring 11b.

When the lever 11a is urged against the resilient force of the coiled spring 11b, it disengages from the ejection lever 9, so that the ejection lever 9 moves forward owing to the resilient force of the coiled spring 10 to restore it to its original condition.

When the cartridge 5 is inserted through the opening 3a into the holder 6, a locking pin 13, provided on a lever 12 which is supported pivotably on the holder 6, is turned against a tension spring 14 to open a shutter 49 for the cartridge 5.

When the cartridge 5 is further pushed into the holder 6, it contacts the lever 11a to turn the same around the setting pin 11c. When the ejection lever 9 has been disengaged from the lever 11a, it is moved forward by the coiled spring 10.

The ejection lever 9 is provided at its bent portions in both end sections thereof with guide recesses 9c. When the ejection lever 9 is moved forward, the rollers 8 provided on the holder 6 move down along the guide recesses 9c. When the holder 6 is moved down with the rollers 8 moving down along the guide recesses 7a, a hub 4a for the magnetic disc 4 fits in a hub receiver 16 in a rotation driving means 15 provided on the chassis 1.

A first magnetic head 17 for recording sounds on the magnetic disc 4 and reproducing the sound recorded thereon is fixed to a first head support member 18, which consists of a steel plate, via gimbals 19 consisting of a thin steel plate.

A second magnetic head 20 for recording sounds on the surface of the magnetic disc 4 is on the opposite side of the surface thereof on which the recording of sounds and the reproduction of the recorded sounds are carried out by the first magnetic head 17, and for reproducing the recorded sounds on the second-mentioned magnetic disc surface.

The second magnetic head 20 is fixed to a second head support member 21, which consistes of a 0.3-0.5 mm metal plate, for example, a stainless steel plate, via gimbals 22 of a 0.05-0.08 mm metal plate, for example, a stainless steel plate. The gimbals 19 and 22 are welded to the first head support member 18 and the second head support member 21, respectively.

The first head support member 18 is provided with a connecting portion 23 which projects sideways, and which is formed integrally therewith. In this embodiment, the first head support member 18 and the connecting portion 23 may be formed by punching a one-piece stainless steel plate, although they are not necessarily made in this manner. The first head support member 18 and the connecting portion 23 may be formed separately to be thereafter welded to each other.

Two guide members 26, which consist of metal rods, are fixed in parallel with each other to the chassis 1 by using a mounting member 1b inserted into the chassis 1, a metal mounting member 24 consisting of a plate spring, and a setting screw 25.

A support (carriage) 27 made of a synthetic resin is mounted movably on the guide members 26. The first head support member 18 and the second head support member 21 are attached to the support 27 so as to hold it therebetween. The positions on these head support members 18 and 21 in which the first magnetic head 17 and the second magnetic head 20 are fixed to the support members 18 and 21 so that the first magnetic head 17 and the second magnetic head 20 face each other, are predetermined.

The second head support member 21 consists of an element 21a supporting the second magnetic head 20, and a support-mounting element 21b of a metal plate which is thinner than the element 21a. The element 21a is retained so that it can be swung upward. The elements 21a and 21b are combined unitarily by a caulk-fitting method.

The second head support member 21 has bent portions 21c at both end sections thereof. Each of the bent portions 21c extends on the outer side of a surface 21d, which is on the opposite side of the surface on which the second magnetic head 20 is fixed, of the second head support member 21 and in the lengthwise direction thereof.

A magnetic head moving means 28 for positioning the first magnetic head 17 and the second magnetic head 20 is provided on the chassis 1. The magnetic head moving means 28 has a motor 28a consisting of a stepping motor, and a screw 28b adapted to be rotated forward and backward by this stepping motor 28a. The stepping motor 28a is fixed to the chassis via a mounting member 28c. When the screw 28b is rotated, a connecting portion 23 of the first head support member 18 which is joined thereto via a nut 28d, moves the support member 18.

A projection 23a, provided on the connecting portion 23, engages a locking portion 44a of an engagement means or a lever 44 fixed to the ejection lever 9. The engagement means 44 is supported on a support pin 44c via a spring 44b. The chassis 1 is provided with a projection 1k.

When the engagement means (lever) 44 has reached the projection 1k of the chassis 1 during the movement of the ejection lever 9, the engagement means 44 is raised by the projection 1k, so that the engagement means 44 disengages from the projection 23a provided on the connecting portion 23. The point in time at which the projection 23a and the locking portion 44a disengage from each other is set later than at least the point in time at which the bent locking portion 11d of the lever 11a engages the locking bore 9b in the ejection lever 9.

The rollers 8 on the holder 6 are on the horizontal portions 9d in the guide recesses 9c in the ejection lever 9 at this time. At the same time, the cartridge 5 is ejected by the operation of the tension spring 14 and the lever 12 on the holder 6. Accordingly, the automatic ejection discharging of the cartridge 5 can be effected in accordance with the pivotal movement of the screw 28b.

The first head support member 18 is provided with bent portions 18a at both end sections thereof. Each of the bent portions 18a extends on the outer side of the surface, which is on the opposite side of a mounting surface 18b to which the first magnetic head 17 is fixed, of the first head support member 18 and in the lengthwise direction thereof.

The second head support member 21 is combined unitarily with the first head support member 18 by screws 29. The support (carriage) 27 is provided with through bores 27a through which scres 29 are inserted, and metallic distant pieces 30 are set in these bores 27a by the insert molding or the pressure fitting.

A spring means 31 is adapted to urge the second head support member 21 so that the second magnetic head 20 is urged against the first magnetic head 17. The spring means 31 consists at least of a coiled spring 31a, and a mounting member 31b of a steel plate to which the coiled spring 31a is fixed.

The mounting member 31b is fixed to the upper surface of the support mounting element 21b in the second head support member 21 by utilizing the screw 29. The mounting member 31b is provided with a member 31c, which is formed integrally therewith, and which is used to attach thereto the interlocking regulating members 32a for a track sensor 32. The track sensor 32 is adapted to restrict and detect the initial position of the support (carriage) 27.

The second head support member 21 is provided with an arm 33 used to swing the second head support member 21 upward, and a terminal base 35 connected electrically to a flexible cord 34 which is connected to the second magnetic head 20. The arm 33 and the terminal base 35 are formed integrally of a synthetic resin having excellent electric insulating characteristics.

The position in which the arm 33 is fixed and the position of the coiled spring 31a in the spring means 31 are substantially on one straight line which extends at right angles to the axis of the second head support member 21.

A head cord 37 is connected to a flexible cord 34 connected to the first magnetic head 17, and a head cord 38 to the flexible cord 34 connected to the second magnetic head 20.

A tension spring 39 is fixed at its one end to a recess 23b in the connecting portion 23, and at the other end to a mounting member 1c inserted into the chassis 1. The connecting portion 23 and the first head support member 18 are continuously urged in a predetermined direction by the tension spring 39.

The front panel 3 is provided with an opening 3b through which a knob 40 made of a synthetic resin, for operating the ejection lever 9, pass to the inside of the front panel 3. The knob 40 is fixed to the front end of the ejection lever 9 by a screw.

The track sensor 32 is fixed to the chassis 1 by a screw 41. The mounting member 28c for the magnetic head moving means 28 is fixed to the chassis 1 by a screw 42 inserted in a screw hole 42a.

The first head support member 18 is fixed to the support 27 by a screw 43 by utilizing a setting hole 27b provided at the front end portion of the support 27, in such a manner that the first head support member 18 is not pivotally moved with respect to the support 27. The support 27 is provided with a bore 27c through which the guide member 26 is moved.

The first head support member 18 is provided with a pivot 18c formed integrally therewith and adapted to be engaged with the central portion of the gimbals 17. The second head support member 21 is provided with a pivot 21e formed integrally therewith and adapted to be engaged with the central portion of the gimbals 22.

The second head support member 21 is also provided with a cylindrical portion 21f, around which the lower end portion of the coiled spring 31a in the spring means 31 is fitted, and an opening 21g, into which the terminal base 35 is fitted. The mounting member 31b is provided with a cylindrical portion 31d around which the upper end portion of the coiled spring 31a is fitted.

The chassis 1 is provided with a recess 1d in which the lower end portion of the support 27 is fitted. The recess 1d is formed to such a size that can prevent the support 27 from colliding with the edge portions of the recess 1d while the support 27 (carriage) is moved on the guide member 26.

The chassis 1 is provided with a printed circuit board on the lower surface thereof. The chassis 1 is further provided with holes 1e and 1f connected to the electric parts mounted on the printed circuit board. The hole 1e is used to fit therein a connector for the head cords 37 and 38. The hole 1f is used to connect the terinal pins 32a of the track sensor 32 to the electric parts.

At the rear end of the ejection lever 9, the engagement means (lever) 44 is provided. The holder 6 is provided with plate springs 45 and 45a for guiding the cartridge 5, and plate springs 46 and 46a adapted to engage the cartridge 5, which is set in the holder 6, and urge the same in a predetermined direction.

A cover 47 made of a steel plate is provided above the holder 6. A projection 1g for positioning the cover 47 is inserted into the chassis 1. The cover 47 is provided at its central portion with a deformation-preventing pin 48 consisting of a screw. The deformation-preventing pin 48 is adapted to contact the holder 6 when a large force is applied to the cover 47 to slightly bend the same, whereby the permanent deformation of the cover 47 is prevented.

The holder 6 is provided with a recess 6a in which the second head support member 21 is fitted, escape holes 6b for preventing the increase in the temperature of the magnetic disc 4, and a member 6c for operating the arm 33. Bent ribs 6d are formed at the edges of the recess 6a. The bent ribs 6d serve to improve the strength of the holder 6, and have the electric and magnetic shielding effects with respect to the second magnetic head 20.

The shutter 49 is provided in the opening 3a in the front panel 3. When the cartridge 5 is not set in the holder 6, the shutter 49 is closed to prevent dust from entering the holder 6 from the opening 3a.

The second head support member 21 is provided with recesses 21h for positioning the arm 33. The chassis 1 is provided at the portion thereof on which the stepping motor 28a is fixed with an escape recess 1h and an escape hole 1i. A pin 33a is formed integrally with the arm 33. A fastener for the head cord 38 is formed by utilizing the pin 33a and arm 33.

In the above-mentioned arrangement, the arm 33 is normally raised by the operating member 6c of the holder 6 to swing the second head support member 21 upward and thereby prevent the first magnetic head 17 and the second magnetic head 20 from colliding with with each other.

In order to use this magnetic recording and reproducing apparatus, the cartridge 5 is inserted into the holder 6 from the opening 3a in the front panel 3 to cause the rear end portion of the cartridge 5 to collide with the lever 11a. As a result, the lever 11a and the ejection lever 9 disengage, and the ejection lever 9 is moved forward by the coiled spring 10, so that the holder 6 is moved downwardly due to the operation of the guide recesses 9c and rollers 8.

When the holder 6 moves downwardly, the hub 4a for the magnetic disc 4 is set on the hub receiver 16, and the first magnetic head 17 and the second magnetic head 20 engage the magnetic disc 4. When the stepping motor 28a is then driver to turn a lead screw 28b, the nut 28d held by the connecting portion 23 moves on the lead screw 28b. Consequently, the connecting portion 23, the first head support member 18, the support 27 and the second head support member 21 move along the guide member 26.

The operation for automatically ejecting the cartridge 5 will now be described. The magnetic disc 4 is provided with a plurality of concentric recording and reproducing regions (which will hereinafter be referred to as tracks) in accordance with the recording capacity thereof. The first magnetic head 17 and the second magnetic head 20 move between these tracks to record sounds in the portion which is between the regions A1 and A2 shown in FIG. 5, and reproduce the recorded sounds.

In this embodiment, the first magnetic head 17 and the second magnetic head 20 are formed so that the locking portion 44a of the engagement means 44 and the projection 23a of the connecting portion 23 engage each other at least in the corresponding position on the inner side of the recording regions A1 and A2 of the magnetic disc 4.

After the locking portion 44a and the projection 23a have engaged each other, the stepping motor 28a is rotated with a driving frequency lower than the normal driving frequency f₁(pps) with which the first magnetic head 17 and the second magnetic head 20 are moved between the tracks during the recording and reproducing of sounds, to rotate the lead screw 28b and move the connecting portion 23 to the outer side of the magnetic disc 4.

When the locking portion 44a has contacted the projection 1k on the chassis 1 as the ejection lever 9 is moved, the locking portion 44a and the projection 23a disengage. The ejection of the cartridge 5 is completed at this time. The cartridge-ejecting operation will be described more in detail later in relation to the driving circuit.

Figure 1:
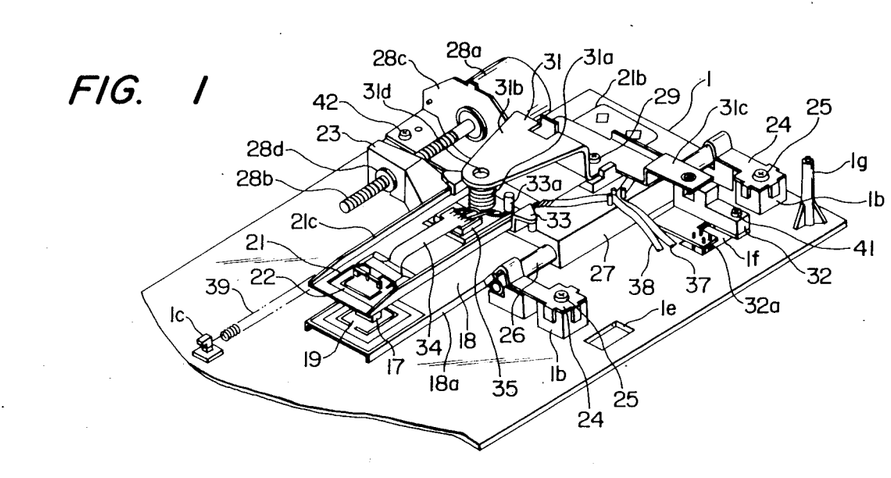
FIG. 1 is a perspective view of the magnetic head driving section of a magnetic recording and reproducing apparatus according to a first embodiment of the invention.
Figure 2:
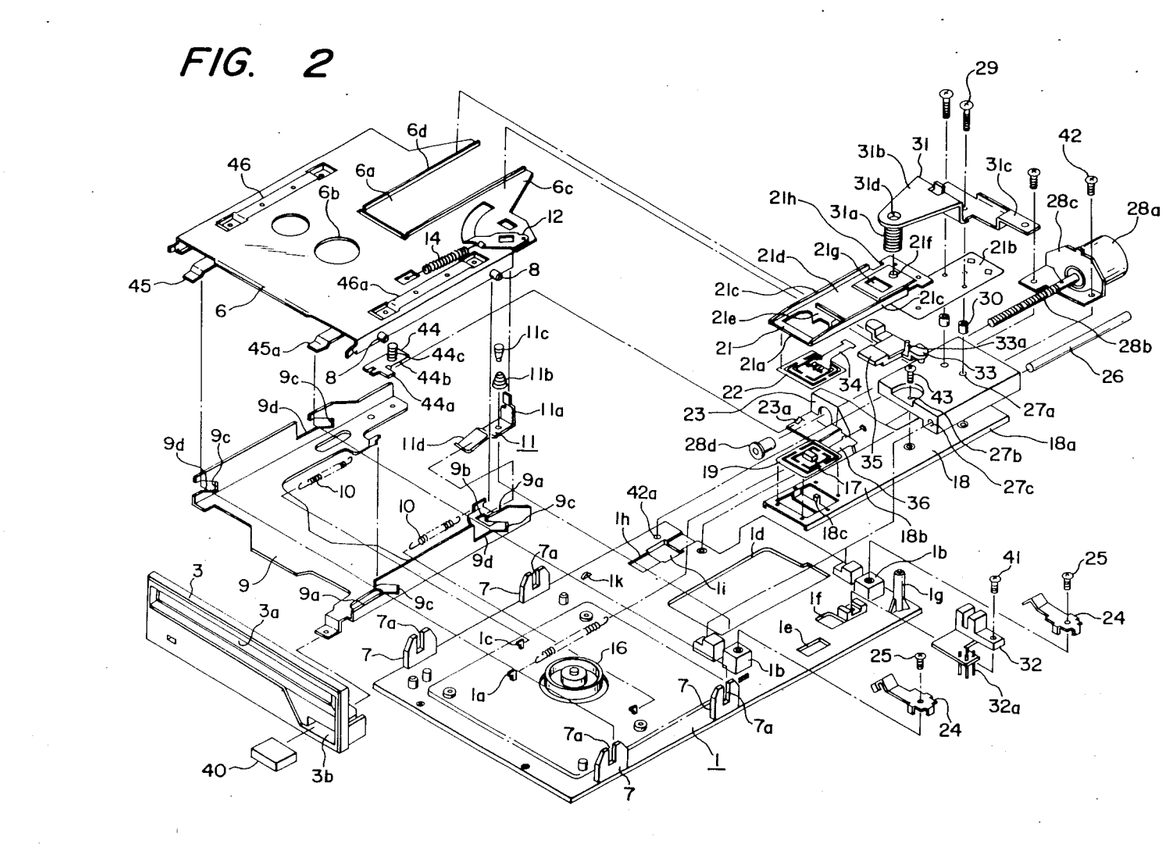
FIG. 2 is an exploded perspective view of the magnetic recording and reproducing apparatus of FIG. 1.
Figure 3:
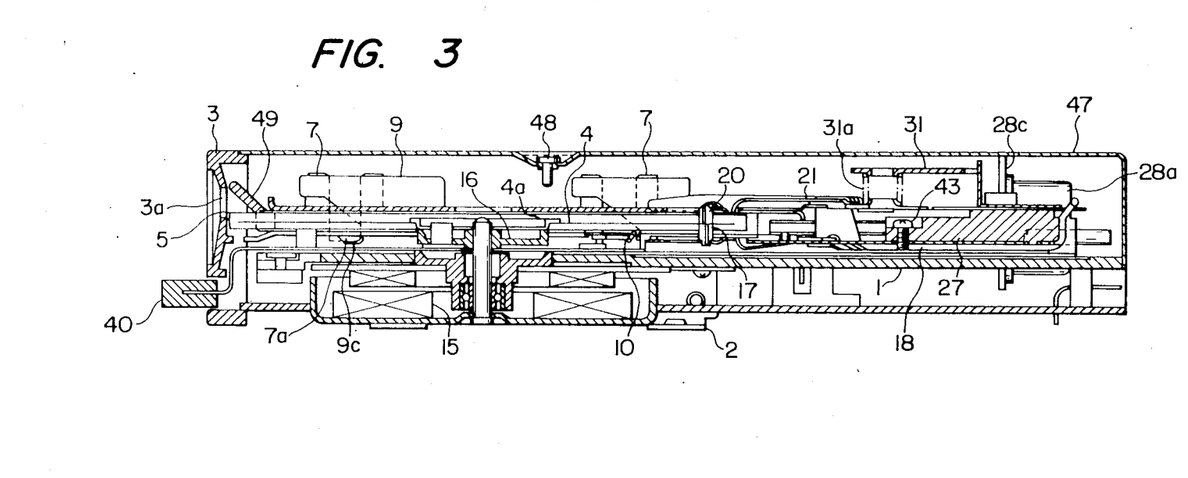
FIG. 3 is a longitudinal sectional view of the magnetic recording and reproducing apparatus of FIG. 2.
Figure 4:
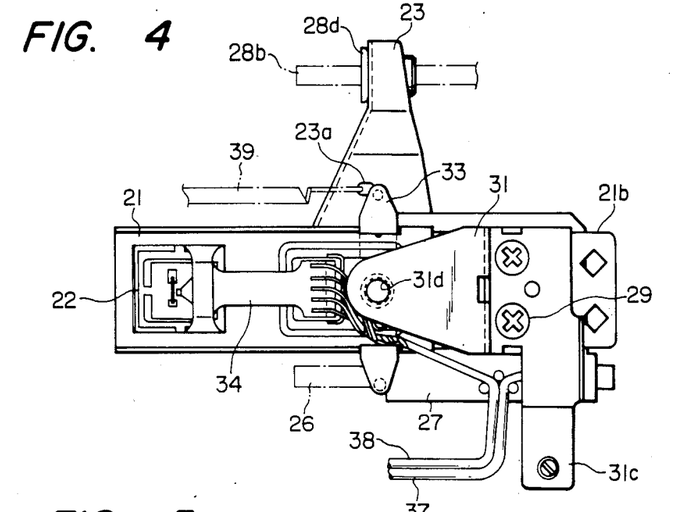
FIG. 4 is a plan view of what is shown in FIG. 1.
Figure 5:
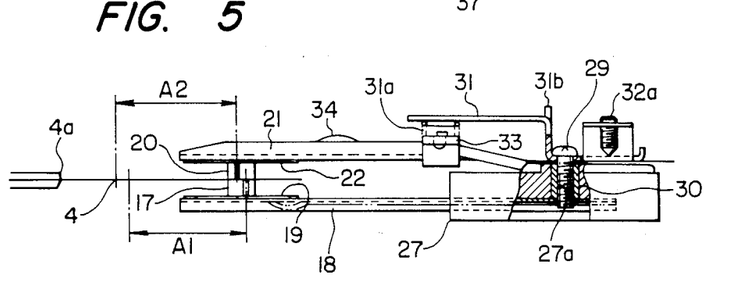
FIG. 5 is a side elevation view of what is shown in FIG. 1.
Figure 6:
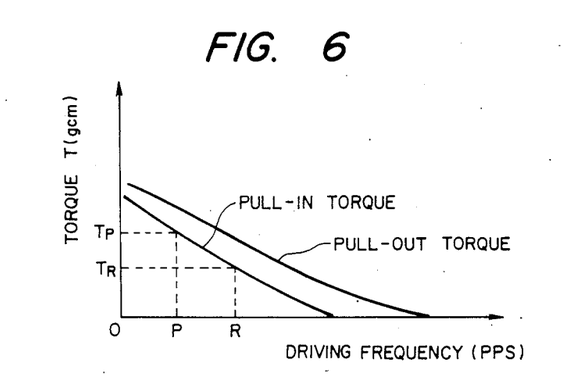
FIG. 6 is a characteristic diagram showing the relationship between the driving frequency of the motor and the torque thereof.

As shown in FIG. 6, the characteristic curves of the pull-in torque and the pull-out torque of the stepping motor 28a decrease as the driving frequency increases.

For example, if the time during which the stepping motor 28a is moved to the adjacent track while a normal recording or reproducing operation is carried out is 3 ms, the lead pitch (which corresponds to the amount of movement of the nut 28d during the rotation of the screw 28b) of the lead screw 28b with respect to the stepping motor 28a, which rotates one step by two-phase excitation and which has a step angle of 15°, is 4.5 mm.

If the diameter of the lead screw 28b is 4 mm, the driving frequency $f_1$ during the movements of the first magnetic head 17 and the second magnetic head 20 between the tracks is substantially 333 pps. If the driving frequency $f_2$ during an ejection operation in which the ejection lever 9 is moved against the coiled springs 10 provided thereon is set to 125 pps, the speed naturally decreases but the circuit torque $T_2$ increases by 20-30% comparison with the torque $T_1$.

Accordingly, even if the stepping motor 28a of a low rotary torque is used, a sufficiently high rotary torque for the discharging of the cartridge 5 can be obtained.

Figure 7:
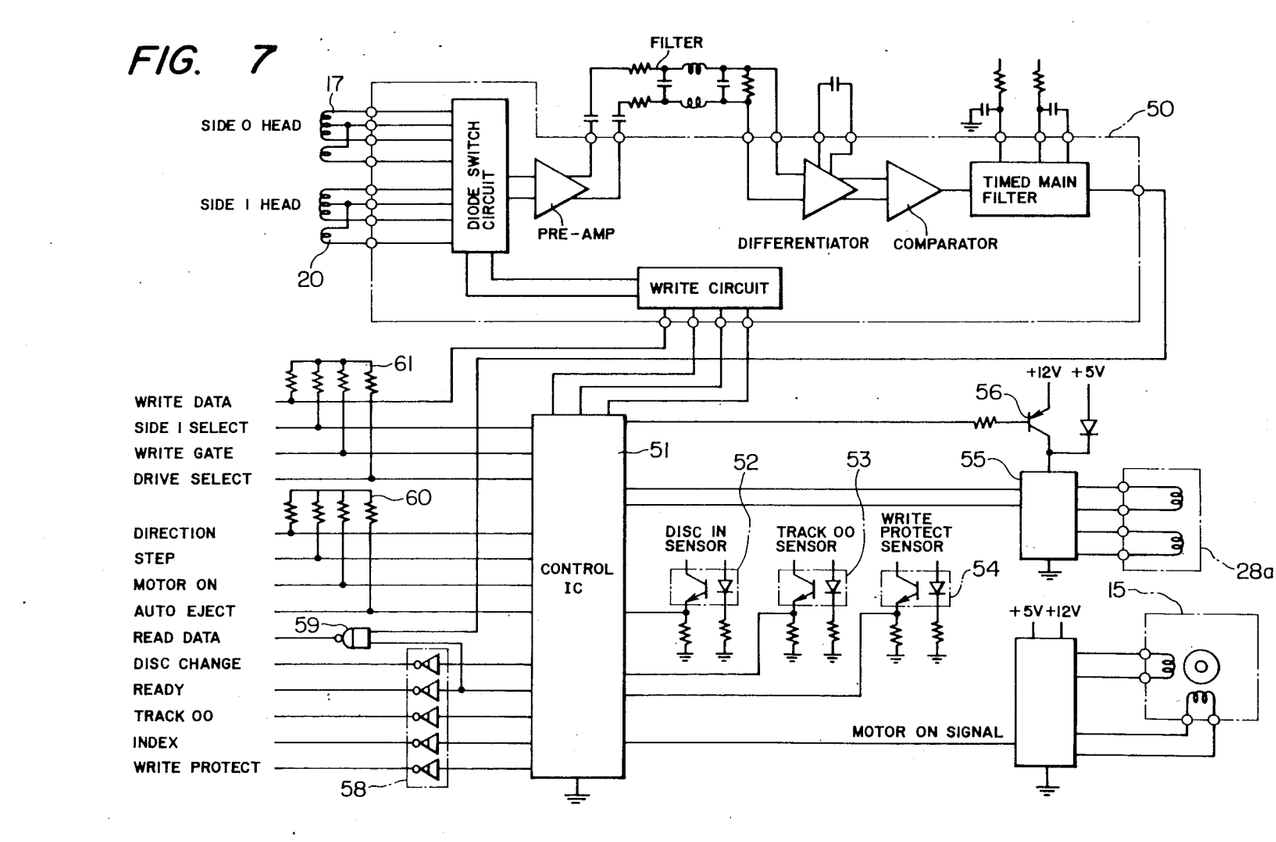
FIG. 7 is a block diagram of a driving circuit.

The driving circuit will now be described with reference to FIG. 7. Referring to the drawing, reference numerals 17 and 20 denote magnetic heads for recording sounds on the magnetic disc 4 and reproducing the recorded sounds.

Reference numeral 50 denotes a read-write-only IC adapted to receive a signal from a host machine, and write the information on the magnetic disc 4 by the first magnetic head 17 and the second magnetic head 20 while magnifying the minute magnetization recorded on the magnetic disc 4 and differentiating the resultant magnetization to reproduce the differentiated magnetization into digital data.

Reference numeral 51 denotes a control IC adapted to control the stepping motor 28a, the rotation driving means 15 and various sesors by a signal from the host machine and consists of a microcomputer or a gate array. In this embodiment, the input signals from the host machine are all signals based on negative logic, and effective when they are at a low level.

Reference numeral 55 denotes a motor driving IC adapted to receive a two-phase signal, the phase of which is staggered at 90°, from the control IC 51 and drive the stepping motor 28a. A transistor 56 and a diode 57 are adapted to receive a signal from the control IC 51 and control the voltage to be applied to the stepping motor 28a.

Reference numerals 58 and 59 denote inverters for transmitting a signal from the control IC 51 to the host machine, the inverters 58 and 59 having open collector outputs, and 60 and 61 are terminations used to match impedances with respect to a signal from the host machine.

Three sensors are used in the embodiment. First, a write protection sensor 54 for preventing the writing in the magnetic disc 4 is adapted to prohibit writing at a low level. A disc-in sensor 52 for indicating whether the magnetic disc 4 is held in the apparatus body is adapted to indicate at a low level that the magnetic disc 4 is held in the apparatus body.

A track sensor 32 for indicating an initial track in the recording and reproducing region of the magnetic disc 4 is adapted to indicate, at a low level that the first magnetic head 17 and the second magnetic head 20 are positioned in the track 00.

Figure 8:
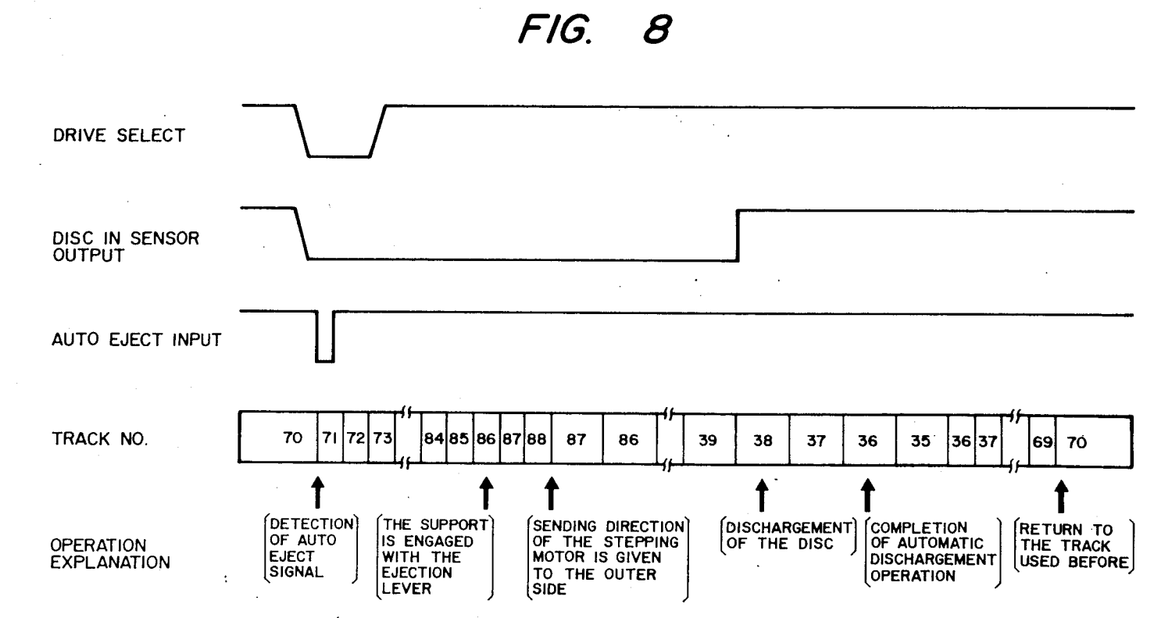
FIG. 8 is a timing diagram of the automatic magnetic disc ejecting operation.

The operation of the automatically discharging the magnetic disc 4 in the embodiment constructed as mentioned above will now be described with reference to the block diagram in FIG. 7 and the time chart in FIG. 8.

When a low-level pulse is applied as an auto eject signal with a drive select signal from the host machine and a signal from the disc-in sensor 52 at low levels, the control IC 51 ignores all input signals thereinto and retains a motor-on signal. The transistor 56 is then turned on the send a two-phase signal, the phase of which is staggered 90°, to the stepping motor-driving IC 55 to move the stepping motor 28a to the inner side of the magnetic disc 4 at about 3 ms.

The first magnetic head 17 and the second magnetic head 20 are moved to the inner side of the recording and reproducing region of the magnetic disc 4, and the locking portion 44a of the engagement means 44 and the projection 23a of the connecting portion 23 engage each other in, for example, the track number 86.

The stepping motor 28a is then further stepped to a track number (track number 88 in this embodiment), which is on the inner side of the track in which the locking portion 44a and the projection 23a engage with each other, by the control IC 51.

When the stepping motor 28a is then driven to the outer side of the magnetic disc 4 at 8 ms, the ejection lever 9 is moved toward the stepping motor 28a against the coiled springs 10, since the locking portion 44a of the engagement means 44 and the projection 23a of the connecting portion 23 are engaged with each other.

When the first magnetic head 17 and the second magnetic head 20 have come close to a position, which is closer to a position in which the mgnetic disc 4 is discharged by the ejection lever 9 than to a position in which the locking portion 44a of the engagement means 44 and the projection 23a of the connecting portion 23 engage each other, the holder 6 is raised along the guide recesses 9c in the ejection lever 9.

When the first magnetic head 17 and the second magnetic head 20 are moved to the track number 38, the holder 6 runs on the horizntal portions 9d of the ejection lever 9. The magnetic disc 4 is then pushed out by the lever 12 and the spring 14.

When the first magnetic head 17 and the second magnetic head 20 are moved further to the outer side of the magnetic disc 4, for example, to the track number 35, the locking bore 9b in the ejection lever 9 and the bent locking portion 11d of the lever 11a engage each other, so that the ejection lever 9 is held firmly.

The engagement means 44 is thereafter raised by the projection 1k of the chassis 1, and the locking portion 44a and the projection 23a disengage from each other. The automatic discharging of the magnetic disc 4 is thus completed.

The control IC 51 is adapted to store the track number used before the magnetic disc 4 is automatically discharged, and can be returned to the track of the number after automatic discharging of the magnetic disc 4 has been completed.

FIGS. 9 to 12 show another embodiment of the connecting structure between the engagement means 44, and the connecting body 23 and the screw 28b.

In FIGS. 9 to 12, the same numerals represent the same elements of those of in FIGS. 1 to 8. Namely, a nut 70 is provided with a curved surface 70a. The spherical surface 70a of nut 70 is urged against a sloped section 23c of the connecting body 23 by a tension spring 39.

A spiral sloped section 28e having a V-shaped groove at 30° of a screw 28b contacts the nut 70 by the connecting body 23 which is biased in one direction by the tension spring 39.

A side end section of a locking portion 70b of the nut 70 always contacts with a side end section of an opening 23d of the connecting body 23, because the nut 70 moves along a spiral slope section 28e of the screw 28b by the tension of the tension spring 39. A projecting portion 70c of the nut 70 engages with an engagement means 80 of the ejection lever 9 so as to eject the cartridge 5 by the rotation of the stepping motor 28a.

Figure 9:
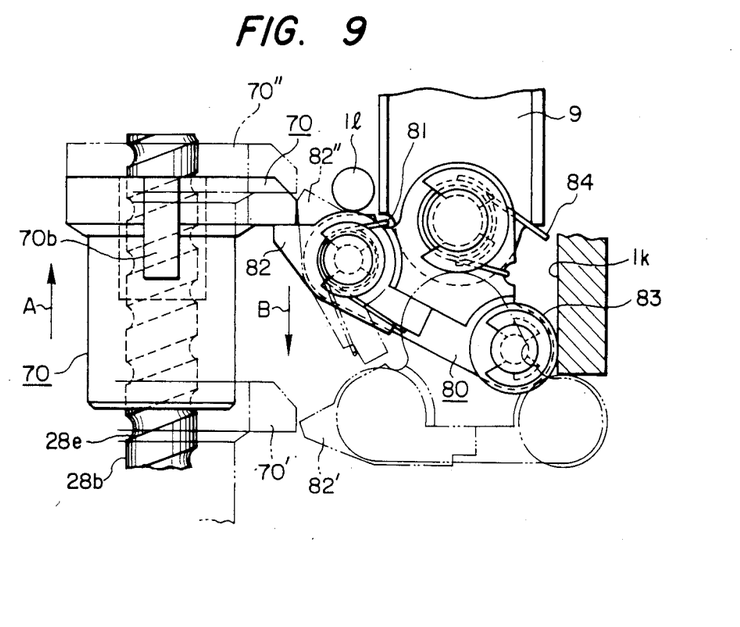
FIG. 9 is an enlarged plan view of the engagement means of a second embodiment of the invention.
Figure 10:
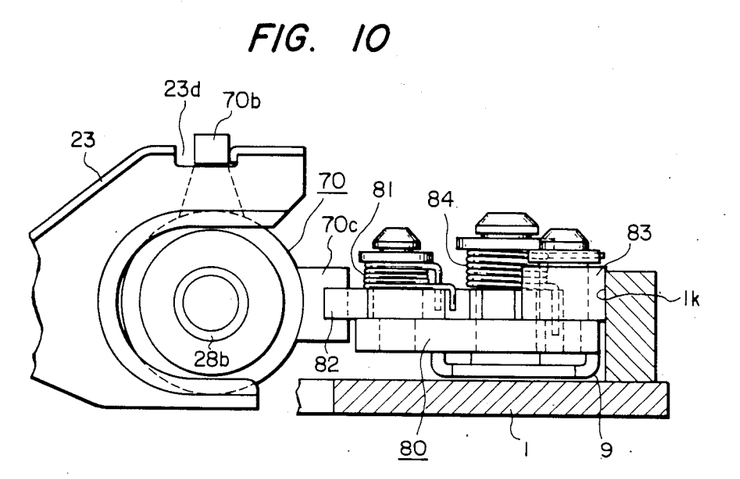
FIG. 10 is an enlarged side view of the engagement means of FIG. 9.
Figure 11:
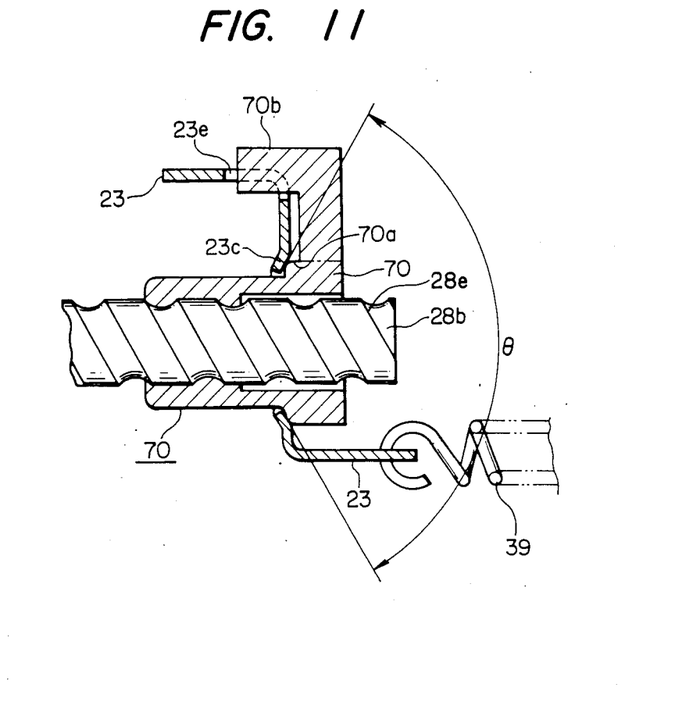
FIG. 11 shows a main enlarged sectional view of the engagement condition between the screw and the nut.
Figure 12:
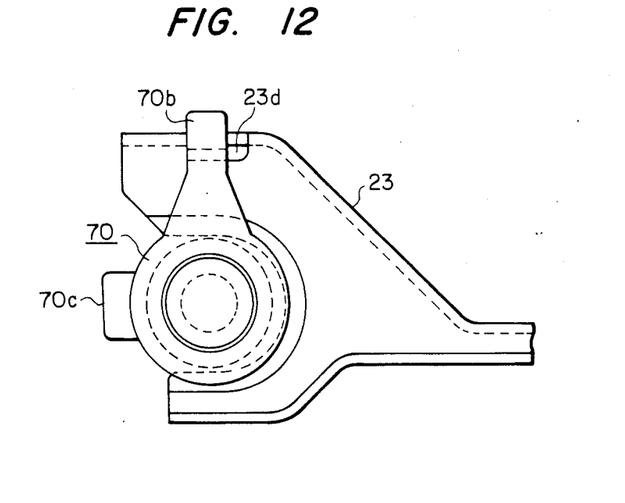
FIG. 12 shows a main enlarged plan view of the engagement condition between the screw and the nut.

The engagement means 80 provided on the ejection lever 9 is shown as a solid line of FIG. 9 in the condition where the cartridge 5 is installed with the holder 6. The nut 70 moves to the position shown in a two-dot chain line 70" by the rotation of the screw 28b (in the direction of arrow A). Then the projecting portion 70c of the nut 70 engages with a ratchet 82 which is held rotatively by a spring 81.

In such a condition, when the screw 28b is rotated reversely, the nut 70 moves to the position shown in the two-dot chain line 70' (in the direction of arrow B direction). A roller 83 contacts rib 1k and returns the position shown by the two-dot chain line 70', and then the ratchet 82 disengages from the nut 70. Such a condition is shown as two-dot chain lines 70' and 82' in FIG. 9.

In the above operation, engagement between the resilient member 11 and the ejection lever 9 is maintained. The holder 6 moves in an upward direction and the cartridge 5 is ejected by the function of the lever 12.

The whole engagement means 80 is supported rotatively and resiliently on the ejection lever 9 and the spring 84. The engagement position between the projecting portion 70c of the nut 70 and the ratchet 82 is defined by the projecting portion 1l provided within the chassis 1, when the cartridge 5 is inserted therein.

According to the embodiment shown in FIGS. 9 to 12, the curved surface 70a of nut 70 contacts the sloped section 23c, which is tapered at an angle θ, of the connecting body 23 by the tension of the tension spring 39, and also the spiral slope section 28e having a V-shaped groove at 30° of the screw 28b contacts the nut 70 along the sloped section 23c at 30°, so that the rotation angle of the screw 28b provided a highly accurate and stable displacement for the nut 70.

The support 27, the connecting body 23, the first head support member 18, the second head support member 21, the first magnetic head 17 and the second magnetic head 20 are arranged at a position perpendicular to the plane surface of the magnetic disc 4 by the guide member 26, respectively.

A clearance 23e between the opening 23d and the locking portion 70b enable a minute inclination for the screw 28b to the plane surface of the magnetic disc 4. By the existence of the clearance 23e, the dimensional accuracy tolerance, which acts as a frictional resistance, hardly affects the operation of screw 28b.

What is claimed is:

1. A magnetic recording and reproducing apparatus comprising:

a support assembly;

a plurality of magnetic heads, supported by said support assembly, for recording signals on and reproducing previously recorded signals from a magnetic disc;

magnetic head moving means, coupled with said magnetic heads, for positioning said magnetic heads with respect to said magnetic disc;

means for feeding said magnetic disc to and ejecting said magnetic disc from engagement with said magnetic heads;

means for coupling said magnetic head moving means with said magnetic disc feeding and ejecting means for effecting the displacement of said magnetic disc feeding and ejecting means by said magnetic head moving means;

said magnetic head moving means including a motor and a drive mechanism displaced by the operation of said motor, said drive mechanism being coupled with said magnetic heads for controlling the position of said magnetic heads with respect to said magnetic disc by the operation of said motor; and wherein said drive mechanism is coupled with said magnetic heads for controlling the position of said magnetic heads with respect to said magnetic disc only by operation of said motor.

2. A magnetic recording and reproducing apparatus comprising:

a support assembly;

a plurality of magnetic heads, supported by said support assembly, for recording signals on and reproducing previously recorded signals from a magnetic disc;

magnetic head moving means, coupled with said magnetic heads, for positioning said magnetic heads with respect to said magnetic disc;

cartridge feeding and ejecting means for feeding a cartridge containing a said magnetic disc to and ejecting said cartridge containing said magnetic disc from a position at which said magnetic disc engages said magnetic heads; and coupling means for coupling said magnetic head moving means with said cartridge feeding and ejecting means for effecting the displacement of said cartridge feeding and ejecting means by said magnetic head moving means;

said magnetic head moving means including a motor and a drive mechanism displaced by the operation of said motor, said drive mechanism being coupled with said magnetic heads for controlling the position of said magnetic heads with respect to said magnetic disc by the operation of said motor; and wherein said drive mechanism is coupled with said magnetic heads for controlling the position of said magnetic heads with respect to said magnetic disc only by operation of said motor.

3. A magnetic recording and reproducing apparatus comprising:
 a housing;
 a plurality of magnetic heads supported by said housing for recording signals on and reproducing previously recorded signals from a magnetic disc;
 magnetic head moving means, coupled with said magnetic heads, for positioning said magnetic heads with respect to said magnetic disc;
 said magnetic head moving means including a motor and a drive mechanism displaced by the operation of said motor, said drive mechanism being coupled with said magnetic heads for controlling the position of said magnetic heads with respect to said magnetic disc by the operation of said motor;
 a holder, supported by said housing and including an ejection lever, for holding a cartridge containing said magnetic disc when said cartridge is inserted onto said housing,
 said drive mechanism being coupled with said magnetic heads for controlling the position of said magnetic heads with respect to said magnetic disc only by operation of said motor,
 cartridge feeding and ejecting means for feeding a cartridge containing said magnetic disc to and ejecting said cartridge containing said magnetic disc from a position at which said magnetic disc engages said magnetic heads,
 coupling means for coupling said magnetic head moving means with said cartridge feeding and ejecting means for effecting the displacement of said cartridge feeding and ejecting means by said magnetic head moving means,
 engagement means, coupled to said ejection lever, for causing said magnetic head moving means to become engaged with said ejected lever in response to the displacement of said magnetic heads to a first portion of a recording and reproducing region whereat said magnetic heads are magnetically coupled with said magnetic disc and for causing said magnetic head moving means to become disengaged from said ejection lever in response to the displacement of said magnetic heads to a second portion of said recording and reproducing region, and
 resilient means, coupled with said engagement means and said holder, for urging said cartridge in a direction away from said magnetic heads towards the outside of said housing in response to said ejection lever becoming disengaged from said magnetic head moving means and thereby effectively ejecting said cartridge containing said magnetic disc from said housing.

4. An apparatus according to claim 3, wherein said magnetic head moving means includes means for displacing said magnetic heads in a region exclusive of said recording and reproducing region, and said engagement means includes means for causing said ejection lever to become engaged with said magnetic head moving means in said region excusive of said recording and reproducing region.

5. An apparatus according to claim 3, wherein said magnetic head moving means includes means for causing said magnetic heads to become disengaged from the recording surface of said magnetic disc in resonse to the displacement of said magnetic heads to said first portion of said recording and reproducing region.

6. An apparatus according to claim 3, wherein said engagement means includes track sensor means for detecting the location of said magnetic heads relative to said recording a reproducing region and providing an output representative of the effective engagement of said magnetic head moving means with said ejection lever.

7. An apparatus according to claim 3, wherein said drive mechanism of said motor includes screw means adapted to be rotated forward and backward by said motor, said engagement means has a locking portion means, said housing provides a connection portion means having a projection means, said connection portion means of said housing is connected to said screw means, and said projection means of said connecting portion means engages with said locking portion means and of said engagement means so as to eject said cartridge containing said magnetic disc by rotation of said motor.

8. An apparatus according to claim 3, wherein said drive mechanism of said motor includes screw means adapted to be rotated forward and backward by said motor, said housing provides a connection portion means having a projection means, said connection portion means of said housing is connected to said screw means, nut means contacts said connection portion means and has a projecting means thereon, and said projecting portion of said nut means is engaged with said engagement of said ejection lever so as to eject said cartridge containing said magnetic disc by rotation of said motor.

9. A magnetic recording and reproducing apparatus comprising:
 a housing;
 a holder, supported with said housing by an ejection lever, for holding a cartridge containing a magnetic disc when said cartridge is inserted onto said housing;
 a plurality of magnetic heads supported with said housing for recording signals on and reproducing previously recorded signals from said magnetic disc;
 magnetic head moving means, coupled with said magnetic heads, for positioning said magnetic heads with respect to said magnetic disc;
 engagement means, coupled to said ejection lever, for causing said magnetic head moving means to become engaged with said ejection lever in response to the displacement of said magnetic heads to a first portion of a recording and reproducing region whereat said magnetic heads are magnetically coupled with said magnetic disc and for causing said magnetic head moving means to become disengaged from said ejection lever in response to the displacement of said magnetic heads to a second portion of said recording and reproducing region; and
 resilient means, coupled with said engagement means and said holder, for urging said cartridge in a direction away from said magnetic heads towards the outside of said housing in response to said ejection lever becoming disengaged from said magnetic head moving means and thereby effectively ejecting said cartridge containing said magnetic disc from said housing;
 wherein said magnetic head moving means includes a motor and a drive mechanism displaced by the operation of said motor, said drive mechanism being coupled with said magnetic heads for controlling the position of said heads with respect to said disc by the operation of said motor; and wherein said magnetic head moving means further includes means for causing said drive mechanism to be displaced by the operation of said motor during the displacement of said ejection lever at a rate slower than during the recording and reproduction operations of said magnetic disc.

10. An apparatus according to caim 9, wherein said means for causing includes means for supplying a motor driving signal at a first frequency to said motor during the displacement of said ejection lever and for supplying a motor driving signal to said motor at a second frequency during the recording and reproduction operations of said magnetic disc, said first frequency being lower than said second frequency.

11. An apparatus according to claim 10, wherein said first frequency is a prescribed fraction of said second frequency.

* * * * *